United States Patent [19]

Armanini et al.

[11] 4,146,403

[45] Mar. 27, 1979

[54] IRON OXIDE COATED MICA NACREOUS PIGMENTS

[75] Inventors: Louis Armanini, Pleasantville; Frank Bagala, Peekskill, both of N.Y.

[73] Assignee: The Mearl Corporation, Ossining, N.Y.

[21] Appl. No.: 900,814

[22] Filed: Apr. 27, 1978

Related U.S. Application Data

[63] Continuation of Ser. No. 690,141, May 26, 1976, abandoned.

[51] Int. Cl.$^2$ ................................................ C09C 1/00
[52] U.S. Cl. .................................... 106/291; 106/300; 106/304; 106/308 B; 106/309; 106/DIG. 3; 428/363; 428/404; 427/218
[58] Field of Search ........... 106/291, 300, 304, 308 B, 106/309, DIG. 3; 428/404, 363; 427/218

[56] References Cited

U.S. PATENT DOCUMENTS

| 3,087,828 | 4/1963 | Linton | 106/291 |
|---|---|---|---|
| 3,711,308 | 1/1973 | Brand et al. | 106/291 |
| 3,874,890 | 4/1975 | Bernhard et al. | 106/291 |
| 3,926,659 | 12/1975 | Bernhard et al. | 106/291 |
| 3,951,679 | 4/1976 | Bernhard et al. | 106/291 |

*Primary Examiner*—O. R. Vertiz
*Assistant Examiner*—Mark Bell
*Attorney, Agent, or Firm*—Ostrolenk, Faber, Gerb & Soffen

[57] ABSTRACT

Iron oxide coated mica nacreous pigments are improved by interposing a thin layer of titanium dioxide or aluminum oxide between the iron oxide and the mica.

12 Claims, No Drawings

IRON OXIDE COATED MICA NACREOUS PIGMENTS

This is a continuation of application Ser. No. 690,141, filed May 26, 1976, now abandoned.

BACKGROUND OF THE INVENTION

Nacreous pigments exhibit pearl-like and/or iridescent effects upon the transmission and reflection of light therethrough. As is well known in the art, the characteristics of such pigments depends upon optical interference phenomena as more fully described, for example, in "The Properties of Nacreous Pigments," Greenstein and Miller, Technical Papers, Vol. XIII, Annual Technical Conference, Society of Plastic Engineers, May 1967.

Nacreous pigments are conventionally formulated for use in suspensions of light transmitting resinous media which can be applied by dipping or spraying operations to form plastic coatings or by extruding, molding, casting, or like techniques to provide solid plastic articles incorporating such pigments. Nacreous pigments so utilized should have indexes of refraction which differ from the suspending media because the pearly or nacreous effect displayed by such pigments depends upon the difference between the index of refraction of the oriented, plate-like pigment particles and the index of refraction of the medium in which they are dispersed.

Mica by itself is not a satisfactory nacreous pigment inasmuch as its average index of refraction is about 1.58 which is too close to the index of conventional transparent resinous media of about 1.50-1.59. Excellent nacreous pigments may, however, be provided by the deposition of titanium dioxide or iron oxide coatings on mica flakes.

Linton U.S. Pat. No. 3,087,828 describes the preparation of titanium dioxide coated mica nacreous pigments which optionally can be topped with a layer of iron oxide, the latter layer amounting to 0.5 to 20 weight percent of the titanium dioxide. The patent indicates that the titanium dioxide layer is at least 10 weight percent of the pigment and indicates that 10 weight percent is equivalent to about 50 mg. $TiO_2/m^2$ mica or $TiO_2$ geometric thickness of about 30 mu.

Linton U.S. Pat. No. 3,087,829 describes a pigment made by depositing hydrated iron oxide on mica and the coating is then dehydrated and crystallized by means of heat resulting in an iron oxide coated mica pigment. The iron oxide constitutes 10 to 40 weight percent of the pigment.

Brand et al U.S. Pat. No. 3,711,308 teaches a coated mica pigment in which a first coat contains titanium or zirconium oxide mixed with iron oxide and a second layer of only the titanium or zirconium oxides which is about twice as thick as the first coating. Bernhard et al. U.S. Pat. No. 3,874,890 teaches a $TiO_2$ coated mica pigment which is top coated with iron oxide in an amount up to 20 percent of the final pigment. The $TiO_2$ coating is about 100-300 mg. $TiO_2/m^2$ of mica surface which, based on Linton's teachings, means that the geometric thickness of the titanium layer is about 60 mu.

Bernhard et al U.S. Pat. No. 3,926,659 teaches that in a mica/$TiO_2$ or $ZrO_2$/$Fe_2O_3$ pigment, the $TiO_2$ or $ZrO_2$ interlayer can be reduced to as little as 5 mg/m$^2$ if the iron is initially deposited as a single form of iron (III) oxide hydroxide, viz., only one of $\alpha,\beta$ or $\gamma$-FeOOH or magnetite. Aluminum oxide can be coated on top of an iron oxide coated mica as a protective layer.

Coatings which are entirely $Fe_2O_3$ are desirable in order to obtain dark metallic looking pigments such as "bronze" or "copper." A serious defect in pigments containing only $Fe_2O_3$ coatings, however, is that the $Fe_2O_3$ layer suffers from poor adhesion to the mica substrate.

Any section of the iron oxide layer which is dislodged or stripped from the mica tends to break up into small particles which scatter light in all directions thereby decreasing the directional, specular character required for nacreous luster. Additionally, no reflection takes place at the exposed mica surface because the refractive index of mica (about 1.58) is close to refractive index of most plastic media (about 1.50-1.59) in which the nacreous pigments are employed. As a result, the nacreous quality or pearly luster of the pigment is diminished.

When nacreous pigments are incorporated into plastics and the plastics are further processed, the plastic composition is subjected to relatively high shear forces. Under such conditions, a minor proportion of the $Fe_2O_3$ surface film is stripped from the mica plate. Consequently, the nacreous luster of the finished plastic articles is muted.

It is known experimentally that better adhesion of $TiO_2$ to the mica substrate can be obtained if higher calcining temperatures are used. In the case of $Fe_2O_3$, however, higher calcining temperatures do not improve the adhesion but only result in a decrease in luster.

It has now been discovered that dark colors and very good adhesion of the $Fe_2O_3$ layer can be obtained if a very thin layer of $TiO_2$ or $Al_2O_3$ is deposited on the mica below the iron oxide layer, and it is not necessary that the iron be deposited initially in a single form. The pigments withstand high shear forces without separation of the iron oxide layer. The pigment platelets therefore retain their integrity and the desired luster and metallic color are exhibited in plastic objects. At the same time, the colorless titanium or aluminum oxide does not have a significant effect on the dark color because its concentration is too low.

$TiO_2$ layers on mica are usually deposited on mica from either a titanium tetrachloride or titanyl sulfate coating bath. Adhesion of the $TiO_2$ is good when $TiCl_4$ is employed. For ease of operation and simplicity, however, it is preferred to use titanyl sulfate. Unfortunately, titanyl sulfate produced $TiO_2$ coated mica is subject to considerable stripping. It was therefore most surprising to find that very thin titanyl sulfate produced $TiO_2$ interlayered $Fe_2O_3$ coated mica exhibited good resistance to stripping.

It is the object of this invention to provide new and improved iron oxide coated mica nacreous pigments which are characterized by being dark metallic looking such as bronze or copper and by a very good adhesion of the $Fe_2O_3$ layer. This and other objects of the invention will become apparent to those skilled in the art from the following detailed description.

SUMMARY OF THE INVENTION

This invention relates to new and improved iron oxide coated mica nacreous pigments. More particularly, the invention relates to new and improved iron oxide-mica nacreous pigments in which a very thin layer of titanium dioxide or aluminum oxide is deposited on the mica below the iron oxide layer.

DESCRIPTION OF THE PREFERRED EMBODIMENTS

The improved iron oxide coated mica nacreous pigments of this invention are suitably formed on mica plates which pass through a 325-mesh screen and which vary from about 1 to 75 microns in length. Preferably, most of the mica platelets fall within 5–35 microns. They range from about 0.03 to 3.0 microns in thickness, the average platelet thickness being about 0.25 microns. On the average, the mica substrates have a specific area (measured by the BET method) of about 1.0 to 6.0 m$^2$/g preferably about 2.0 to 4.5 m$^2$/g.

The mica particles are coated with TiO$_2$ or Al$_2$O$_3$ by treating the mica particles with an aqueous acidic solution of a suitable titanium or aluminum compound. The titanium compound coating bath may contain titanyl sulfate, with or without added H$_2$SO$_4$. The aluminum compound coating bath should contain an aluminum compound which can be hydrolyzed to and deposits as a hydrous aluminum oxide on the mica particles. Such a compound can, e.g., be AlCl$_3$.CH$_2$O.

Suitably, the mica particles are suspended in the titanium or aluminum compound containing coating bath at concentrations within the range of about 0.1 to 25% mica while simultaneously maintaining the titanium or aluminum compound concentration (expressed as TiO$_2$ or Al$_2$O$_3$, respectively) at about 0.05 to 3%. The titanium compound concentration is preferably about 0.05 to 0.75% and most preferably 0.75 to 1.5%. The mica concentration in the slurry and titanium or aluminum compound concentration are regulated such that a very thin layer of TiO$_2$ or Al$_2$O$_3$ is deposited on the particles. The coating layer coverage of the mica is about 5 to 35 mg/m$^2$ and a geometric thickness of about 2 to 21 mu. The resulting titanium or aluminum layer on the mica will be about 1 to 7 weight percent of the titanium or aluminum coated mica.

The slurry is maintained at an acid pH, i.e., below about 6, preferably below about 3 when coating with titanium, and preferably above 3 when coating with aluminum. This can be accomplished by adding a suitable acid such as a mineral acid and/or base such as sodium hydroxide to the slurry. The system is heated to about 60° to 100° C. to effect hydrolysis of the titanium or aluminum compound to hydrous titanium dioxide or aluminum oxide which is thereupon deposited in the amorphous form on the surfaces of the mica particles. This process can require from as short a period as 10 minutes to as much as 4 hours to complete.

The thus treated mica particles are separated from the mother liquor by filtering, centrifuging or settling operations, and thereafter washed with water to remove excess acid or base and impurities. The amorphous coated mica filter cake can thereafter be dried and calcined or directly calcined prior to the deposition of the iron coating in the same manner as described hereinafter. It is preferred, however, to proceed directly to coating the TiO$_2$ or Al$_2$O$_3$ coated mica with iron oxide.

The iron coating procedure is the conventional hydrolysis coating procedure. It is not necessary, as in U.S. Pat. No. 3,926,659, to oxidize an iron salt with an oxidizing agent such as air while maintaining a constant pH. Conveniently, the coated mica is suspended in an acidic solution of an appropriate iron salt which is then hydrolyzed to form a hydrous oxide film on the coated mica surface. The salt used is not critical and will usually be chosen on the basis of availability. Ferric chloride will be the most usual salt but it is equally feasible to use a ferric sulfate or other water soluble ferric salt. The stable water solutions of the salts are strongly acidic in character and the hydrous oxide is precipitated when the acidity is partly reduced. The latter is accomplished by adding a suitable base, such as sodium hydroxide, to the slurry which can also contain, if desired, an acid accepting buffer salt such as sodium acetate and sodium tetraborate. The resulting hydrous oxide will be a mixture of hydroxide forms, such as, e.g., a mixture of α- and δ-FeOOH.

The concentration of the iron salt in the aqueous solution can vary over a wide range of from about 2% to saturation with a preference for the range of about 30 to 50%. The amount of salt solution relative to the mica is significant only as a means of controlling the amount of iron oxide deposited. The amount of iron oxide in the final calcined pigment should be about 20 to 50 weight percent, preferably about 25 to 40%.

In a preferred procedure, the iron salt-coated mica slurry is maintained at a substantially constant pH of about 2 to 4 and the system is heated to about 60 to 100° C. to effect hydrolysis of the salt to hydrous iron oxide. This procedure can take as little as 10 minutes to as much as 4 hours to complete.

The thus coated mica particles are separated from the mother liquor by filtering, centrifuging or settling operations and thereafter washed with water to free the particles from the slurry reagents and impurities. If desired, the filter cake can be dried prior to calcination. Drying can be in air at about 105° to 175° C. for 0.5 to 5 hours or under vacuum at about 20° to 110° C. and pressures as low as 0.01 mm.Hg for 0.5 to 20 hours.

Finally, the coated mica particles are calcined to convert the hydrous coatings to the final oxide coatings. Calcination is usually carried out within the temperature range of about 650° to 950° C. for about 0.1 to 3 hours or longer.

The final calcined product is a Fe$_2$O$_3$ coated mica with a very thin intermediate layer of TiO$_2$ or Al$_2$O$_3$. In general, the mica is about 50 to 75% of the final product, the iron oxide is about 25 to 45% and the TiO$_2$ or Al$_2$O$_3$ is about 0.5 to 4%. The Fe$_2$O$_3$ layer adheres and the pigments withstand the high shear forces encountered when incorporated in the plastics. At the same time, the colorless TiO$_2$ or Al$_2$O$_3$ does not have a significant effect on the dark color because its concentration is so low.

The following examples are set forth in order to further illustrate the invention but are not intended to limit it. Throughout this specification and claims, all parts and percentages are by weight and all temperatures and degrees are Centigrade unless otherwise indicated.

In the following examples, reflectance measurements were made by means of conventional drawdowns on a hiding power chart. The drawdowns were prepared from a suspension containing 3% platelets in a nitrocellulose lacquer of the following composition:

2.9% 15/20 sec. RS cellulose nitrate
6.6% 30/40 sec. RS cellulose nitrate
5.1% Isopropanol
44.8% Amylacetate
37.6% n-Butyl acetate
3.0% Mono-butoxydiethylene glycol The spectrophotometric curve of the sample was determined with a Trilac Spectrophotometer by the technique described by Greenstein and Bolomey, Journal of the Society of Cosmetic Chemists, March 1971, using an angle of incidence and an angle of viewing of 15° to the normal, and relative to a pressed cake of barium sulfate. The maximum reflectance ($R_{max}$) is a measurement of nacreous luster.

It is very inconvenient and time consuming to measure adhesion by incorporating each prepared nacreous pigment in a suitable plastic and then subjecting it to the mixing action of a Banbury mixer. Therefore, two simpler measurements were employed.

For the simpler measurements, a Hoover Automatic Muller was used. This unit consists of two glass plates, one of which rotates at a constant speed over a stationary plate causing shear forces to develop which simulate the action of a Banbury.

3.00 Grams of the pigment were throughly mixed with 3.99 grams of Paraplex G-50, a polymer plasticizer having a viscosity of 23 Poise. 4.66 grams of the mixture were placed between the plates of the Hoover Muller under a force of 100 lbs. pressure and mulled for one minute. 2.33 grams of the mulled sample were mixed with 33.33 grams of the nitro-cellulose lacquer described above and a drawdown prepared. A similar drawdown was prepared with the unmulled sample. Reflectance measurements were then made using a Trilac Spectrophotometer as described above and the percentage of the platelets which were stripped was calculated by the following equation:

$$\% \text{ stripped} = 100 \frac{R_{max} \text{ (unmulled)} - R_{max} \text{ (mulled)}}{R_{max} \text{ (unmulled)} - 1.6}$$

The value of 1.6 in the above equation is the reflectance value of the drawdown lacquer without pigment relative to a barium sulfate pressed cake.

In the more time consuming procedure, samples of various pigments were incorporated into high density polyethylene using a Banbury mixer. The stripping caused by this procedure was observed miscroscopically and counted. Any portion of the coating stripped from the surface was counted as a stripped particle. Then the percentage stripped was calculated. The correlation between the Hoover Muller test (Trilac calculation) and the Banbury test (microscopic counting) is shown in Table 1.

Table 1.

| Sample | % Stripped Banbury Count | Hoover Muller Trilac Calculation |
|---|---|---|
| A | 8.2 | 6.9 |
| B | 11.0 | 14.3 |
| C | 23.0 | 24.5 |
| D | 49.7 | 44.2 |
| E | 60.0 | 59.4 |
| F | 10.0 | 4.0 |

Table 1 indicates that the results of the Hoover Muller calculation gave a reasonably good correlation to the results obtained when a pigment is subjected to shear forces in a Banbury mixer. for all intents and purposes, 5 to 10% stripping can be tolerated without a large change in visual appearance while any larger change can easily be detected visually.

An alternative method of measuring the percentage of platelets stripped involves the measurement of the decrease in luster exhibited by the drawdowns prepared in the Hoover Muller test. In this method, a "TV" 35° Glossmeter was calibrated to read 100% on the unmulled sample drawdown and the mulled sample drawdown reading when subtracted from 100 was the percentage of platelets stripped. Correlation between the results obtaind in the Trilac calculation and the Glossmeter test are shown in Table 2.

Table 2.

| Sample | % Stripped Trilac Calculation | Glossmeter Test |
|---|---|---|
| G | 65.5 | 73 |
| H | 69.5 | 70 |
| I | 3.2 | 0 |
| J | 4.6 | 1 |
| K | 9.4 | 4 |
| L | 11.1 | 6 |
| M | 15.8 | 12 |
| N | 36.8 | 25 |

Although the correlation was not exact, the diminution of luster as measured by the Glossmeter gave a good indication of the extent of stripping.

EXAMPLE 1

300 Grams of mica having a BET surface area of 3.0 $m^2/g$ were dispersed in 3 liters of distilled water and the slurry heated. At 68° C., 88.5 ml of a titanyl sulfate solution (12.55 mg $TiO_2$/100 ml) containing 4.4 ml of concentrated $H_2SO_4$ were added and the resulting slurry was heated to reflux and maintained at reflux for one hour. The slurry was then allowed to settle and cool, the supernatent liquid removed and replaced with three liters of distilled water. The slurry was redispersed and allowed to resettle. The supernatent liquid again removed and replaced with two liters of distilled water.

The slurry was then heated to 74° C. and maintained at this temperature while a 39% $FeCl_3$ solution was added at the rate of 90 ml/hour while the pH was maintained constant at 3.3 by addition of 35% NaOH. A total 450 ml iron solution was added. A 50 ml sample of the resulting platelets were washed on a Buchner funnel with 200 ml of distilled water and calcined as a wet cake at 850° C. for 15 minutes.

The calcined platelets had a golen bronze color and a $R_{max}$ of 52.8% at 610 mm. The adhesion of the coating to the substrate was measured and the Glossmeter result was 7% stripping.

EXAMPLES 2-3

Example 1 was repeated twice using different batches of mica. In Example 2, mica having a BET surface area of 3.0 $m^2/g$ was employed and the calcined pigment exhibited 12.0% stripping. In Example 3, the mica had a BET surface area of 3.0 $m^2/g$ and 0% stripping was measured.

EXAMPLE 4

200 Grams of mica were dispersed in one liter of distilled water with stirring. The slurry was heated to 74° C. and a 10% $AlCl_3.6H_2O$ solution in distilled water was added at a rate of 120 ml/hour while maintaining the pH at 5.0 by the simultaneous addition of 35% NaOH. A total of 140 ml of the aluminum solution were added and the slurry was then stirred for one hour. Thereupon, a 39% $FeCl_3$ solution was added at a rate of 50 ml/hour while maintaining the pH at 3.5 by the addition of the 35% caustic solution. A total of 350 ml of the 39% $FeCl_3$ solution was added. The platelets were then washed on a Buchner funnel with four liters of distilled water and calcined as a wet cake at 850° C. for fifteen minutes.

The calcined platelets had a golden bronze color and a $R_{max}$ of 59.4% at 597 mm. The adhesion of the coating to the substrate was measured using the Glossmeter and 6% stripping was found.

EXAMPLES 5-6

The procedure of Example 4 was repeated twice with slight variations in the amount of aluminum solution and iron solution employed. The nacreous pigment of Example 5 had a bronze color and containd 66.1% mica, 1.1% $Al_2O_3$ and 32.8% $Fe_2O_3$. The nacreous pigment of Example 6 had a copper color, and contained 61% mica, 1% $Al_2O_3$ and 38% $Fe_2O_3$.

In order to demonstrate the necessity of a very thin intermediate layer, the following experiments were carried out.

EXAMPLES 7-8

270 Grams of mica were slurried in 2300 ml of distilled water and placed in a stirred vessel having baffles. The mica slurry was heated to reflux over a 45 minute period during which time a solution containing 665 ml of the titanyl sulfate solution (12.5 grams $TiO_2$/100 ml) and 33 ml of concentrated $H_2SO_4$ was added. After refluxing for one hour, the coated platelets were removed, washed with six liters of distilled water on a Buchner funnel, air dried at 120° C. overnight and calcined at 850° C. for 15 minutes. The resulting platelets had a white pearl color and an $R_{max}$ of about 45%.

The foregoing procedure was repeated twice using different batches of mica each of which had a BET surface area of about 3.0 $m^2/g$. The resulting platelets were tested for adhesion of the coating using the Hoover Muller test and found to have 28% and 20% stripped platelets respectively. The geometric thickness of the $TiO_2$ layer was about 66 mu.

Mica which is coated with iron oxide only is subject to considerable stripping, the degree of which varies significantly from batch to batch of mica for reasons which are unknown. This is illustrated by the following six experiments.

EXAMPLES 9-14

200 Grams of mica were dispersed in one liter of distilled water and placed in a vessel having baffles which were stirred throughout the coating procedure. The pH of the slurry was raised to 2.8 by addition of an aqueous 39% ferric chloride solution. The temperature was then raised to 74° C. and maintained at this temperature during the coating procedure. Upon reaching 74° C., additional ferric chloride solution was added at the rate of 50 ml per hour while maintaining the pH at 3.3 by simultaneous addition of an aqueous 35% caustic solution. A total of 250 ml of the ferric chloride solution was added. The resulting coated platelets were washed with four liters of distilled water on a Buchner funnel to remove adsorbed ions, air dried at 120° C. for one hour and calcined at 850° C. for one hour. The percent stripped was then determined by the Hoover Muller test.

In the Examples 9, 10 and 11, mica from the same batch and having a BET surface of 3.0 $m^2/g$ were used and the percent stripped was 51.2%, 36.8% and 62.1%, respectively. In Examples 12, 13 and 14, mica from a different batch which also had a BET surface area of about 3 $m^2/g$ were used and the percent stripped was 7.9%, 11% and 4%, respectively.

Mica from the same batch was used in Examples 1, 7 and 9-11 and mica from the same batch was used in Examples 2, 8 and 12-14. Since the $TiO_2$ layer is directly adhered to the mica, it is expected that the adhesion of this layer will primarily control the amount of stripping in the pigment. It was therefore very surprising to find that by reducing the thickness of the titanium layer substantially from that conventionally employed, a very significant increase in adhesion could be realized. The foregoing Examples demonstrate that the mica batch which had previously given very poor stripping results for either $TiO_2$ alone (28%—Example 7) or $Fe_2O_3$ alone (36.8%-62.1%—Examples 9-11) now gave good results (7%—Example 1). Similarly, the mica batch which had given good stripping results with $Fe_2O_3$ alone (4-11%—Examples 12-14) but very poor results with $TiO_2$ alone (20%—Example 8) now gave good stripping results (12%—Example 2).

EXAMPLE 15

100 Grams of mica having a BET surface area of 3.0 $m^2/g$ were dispersed in 1 liter of distilled water and heated. At 68° C., 83 ml of a titanyl sulfate solution (12.55 mg. $TiO_2$/100 ml) containing 4.1 ml of concentrated $H_2SO_4$ were added and the resulting slurry was heated to reflux and maintained at reflux for one hour. The slurry was then allowed to settle and cool and the supernatant liquid removed and replaced with 1.5 liter of distilled water. The slurry was redispersed and allowed to resettle. The supernatant liquid was again removed and replaced with 1.0 liters of distilled water.

The slurry was then heated to 74° C. and maintained at this temperature while a 39% $FeCl_3$ solution was added at a rate of 75 ml/hr while the pH was maintained constant at 3.3 by addition of 35% NaOH. A total of 150 ml were added. A 50 ml sample of the resulting platelets were washed on a Buchner funnel with 200 ml of distilled water and calcined as a wet cake at 850° C. for 15 minutes.

The calcined platelets had a golden bronze color, an $R_{max}$ of 45.0% at 640 mm, and a stripping of 17.2%, as determined by the Trilac Spectrophotometer.

A portion of the wet cake was subjected to X-ray defraction without any prior heat treatment. The diffraction pattern showed the presence of more than one form of iron oxide hydroxide, namely, $\alpha$-FeOOH and a second form which is probably $\delta$-FeOOH. After the calcining at 850° C., the only form of iron was $\alpha$-$Fe_2O_3$. The original coating consisted of more than one form of iron oxide hydroxide.

Various changes and modifications can be made in the process and products of this invention without departing from the spirit and scope thereof. The various embodiments set forth herein were for the purpose of illustrating the invention but were not intended to limit it.

What is claimed is:
1. A process for the preparation of a nacreous pigment having increased stripping resistance which comprises:
    (a) coating micaceous particles with a colorless oxide selected from the group consisting of titanium dioxide and aluminum oxide in the amorphous form by deposition from a colorless oxide precurser containing coating bath at a rate such that the resulting colorless oxide layer is 5-35 mg/$m^2$ and about 1 to 7 weight percent of the colorless oxide coated mica;

(b) coating the colorless oxide coated micaceous particles with a mixture of α and δ iron oxide in the amorphous form in an amount such that the final calcined product contains about 20–50 weight percent iron oxide by deposition by hydrolysis from an iron compound containing coating bath; and (c) calcining the resulting particles at about 650°–950° C. to produce the desired nacreous pigment.

2. The process of claim 1 wherein said colorless oxide is titanium dioxide and said colorless oxide precurser coating bath contains about 0.05 to 3 percent titanyl sulfate.

3. The process of claim 2 wherein the titanyl sulfate concentration is about 0.05 to 0.75 percent.

4. The process of claim 3 wherein the titanyl sulfate concentration is about 0.1 to 0.5 percent.

5. The process of claim 1 wherein the colorless oxide is aluminum oxide and the aluminum compound precurser concentration in the aluminum compound precurser containing coating bath is about 0.05 to 3 percent.

6. The process of claim 5 wherein the aluminum compound concentration is about 0.5 to 3 percent.

7. The process of claim 6 wherein the aluminum compound concentration is about 0.75 to 1.5 percent.

8. A non-striping iron oxide coated mica nacreous pigment having a thin interlayer of a colorless oxide produced by the process of claim 1.

9. The nacreous pigment of claim 8 wherein the iron oxide is 20 to 50 weight of the pigment, the mica is 50 to 75 weight percent of the pigment, and the colorless oxide is 0.5 to 4 weight percent of the pigment.

10. The nacreous pigment of claim 9 wherein the iron oxide is 25 to 40 weight percent of the pigment and wherein the colorless oxide is present in an amount of 5 to 35 milligrams per square meter of mica surface and has a geometric thickness of 2 to 21 mu.

11. A nacreous composition, comprising a light transmitting resinous medium having suspended therein or supported thereon the nacreous pigment of claim 8.

12. An iron oxide coated mica comprising mica having on the surface thereof a thin layer of colorless oxide selected from the group consisting of titanium dioxide, aluminum and the hydrous forms thereof, the amount of colorless oxide being 5–35 mg/m$^2$ mica, and the colorless oxide having on the surface thereof a mixture of α-FeOOH and δ-FeOOH, the amount of said mixture being 20–50 weight percent of the total weight of the iron oxide coated mica.

* * * * *